May 6, 1952     J. FISCHER     2,595,832
ADJUSTABLE AUTOMOTIVE MIRROR MOUNTING
Filed Nov. 1, 1948
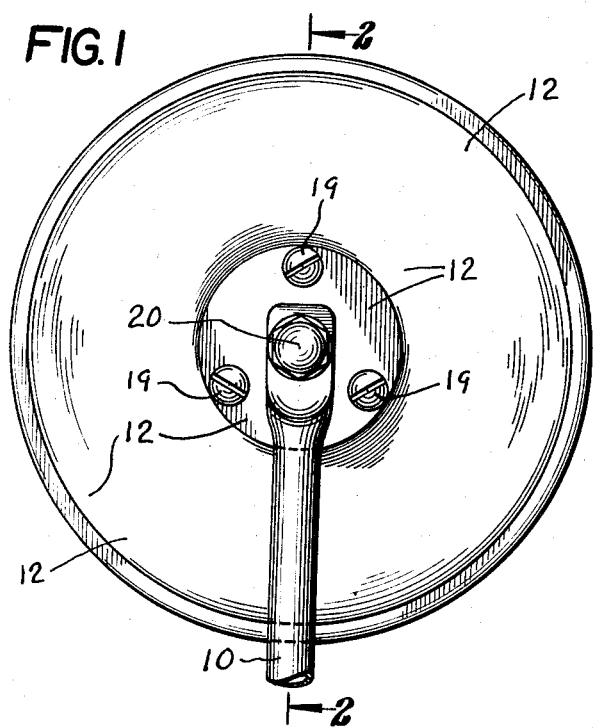
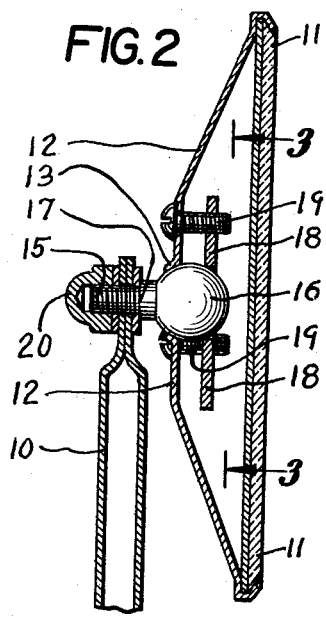
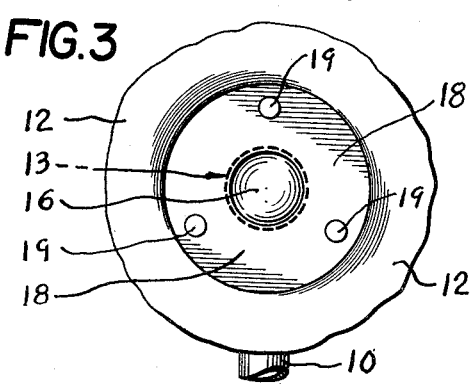
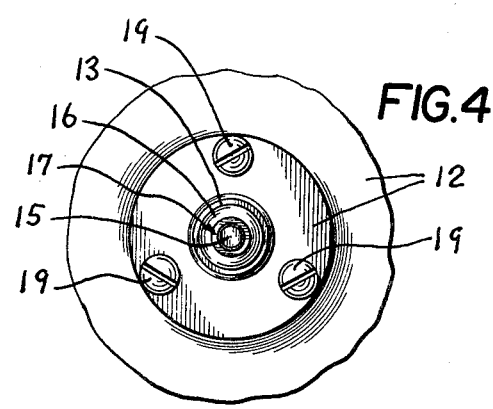
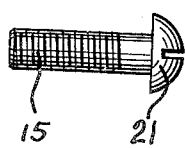
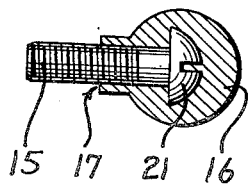
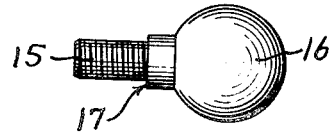
INVENTOR.
JOSEPH FISCHER
BY
James C. Ledbetter
ATTORNEY Patented May 6, 1952

2,595,832

UNITED STATES PATENT OFFICE 2,595,832

ADJUSTABLE AUTOMOTIVE MIRROR MOUNTING

Joseph Fischer, New York, N. Y.

Application November 1, 1948, Serial No. 57,714

1 Claim. (Cl. 287—21)

This invention relates to mirror fixtures of the rear-view type for use on automobiles, trucks, and the like, and is referred to herein as an adjustable automotive mirror mounting.

Rear-view mirrors for the outside of motor vehicles are mounted on the outer end of a bracket arm, and a swivel-joint support is desirable and usually provided in order that an exact rear-view adjusted vision-alignment may be made with the road behind a car. In installing a rear-view mirror on a car, this adjustment is so made that the mirror is lined up for a clear view of the road, and the swivel connection is then set up tightly by screw means in order to fix and hold the mirror on its supporting arm to the correctly adjusted position.

More particularly as to rear-view mirrors for motor trucks, it is well to make the swivel-joint conveniently detachable in order that a damaged mirror may be removed and a new mirror mounted upon the original bracket arm without disturbing the installation of the latter on a truck.

A purpose of the invention is to provide a new swivel-joint mounting means by which the two foregoing requirements are more economically and efficiently provided for than in conventional practice. Thus the new mirror mounting means herein readily lends itself to rear-view alignment and also holds its position when tightened, as well as facilitating removal of a broken mirror assembly and mounting a new one on the original bracket arm.

In carrying out the foregoing, which is important in respect to rear-view mirrors for motor trucks, it is an especial purpose of this invention to produce a bimetallic ball screw stud, the ball-swivel portion of which is semi-hard to effect a rigidly cushioned grip for holding a permanent rear-view adjustment, and the screw-threads portion of which is full-hard to withstand wear and tear encountered in motor truck service.

This description and the accompanying drawings explain the invention by reference to its structural form or forms preferred at this time in aid of understanding the problems sought to be solved. New principles and teachings of an invention ordinarily suggest other samples of construction to those who wish to avail themselves of the benefits of an invention, but such modifications usually are the same in spirit and principle as the original invention.

Fig. 1 shows the back side or rear elevation of a rear-view mirror-head assembly embodying the invention, which is of particular utility in the truck mirror art, with a bracket arm having its outer end attached to the new ball swivel-joint herein which carries the mirror. The inner end of the arm is broken away since it does not relate to the invention.

Fig. 2 is a cross section taken on the line 2—2 showing the ball-and-socket joint, my new swivel mounting, for a rear-view mirror.

Fig. 3 is a fragmentary elevational view within the mirror housing, as developed on the line 3—3, omitting the mirror glass, and showing a front view of the front-half portion of the ball-swivel seat enclosed within the mirror-head assembly.

Fig. 4 is a fragmentary rear elevational view of the mirror housing, with the supporting bracket arm and its fastening nut removed, showing the ball portion of the swivel-joint and, in this example, three screws for tightening and locking the swivel-joint in permanent position after the mirror is adjustably aligned for sight and rear-vision of the road at the rear of a car or truck.

Fig. 5 shows an ordinary stove bolt, as an example of one type of screw, which may be used in accordance with this invention in economically producing a ball joint for the swivel mount on the supporting arm at the back of the mirror housing.

Fig. 6 shows a die-cast ball and shoulder molded or cast onto the screw of Fig. 5, the cast ball portion being shown in section, thus providing a bimetallic ball and screw stud which is found to be of increased utility in the manufacture of truck mirrors.

Fig. 7 shows the finished bimetallic ball in elevation formed of two metallic constituents in order to provide hard iron or steel screw-threads of durable form and a semi-soft metallic ball adapted to be confined and cushion gripped within a retaining swivel seat.

In the drawings, the outer end of a conventional bracket arm 10 supports a mirror-head assembly in a known manner. The inner end of the arm 10 is omitted (shown broken away) inasmuch as it is provided with a clamp or other form of anchorage means of conventional form adapted to be secured to the outer side of the door or body of the car to hold the mirror outward in spaced relation in order to gain a clear view of the road for the driver inside of the car.

A rear-view mirror 11 is fixed in the usual way in a mirror back or housing 12. The mirror housing is perforated and provided with annular flange 13 which rims the perforation. Two or more screw holes are set through the mirror housing 12 and symmetrically arranged around the annular flange 13. This flange is formed outwardly of the mirror housing and constitutes a stationary seat portion for a ball joint, as will be seen.

A ball-joint screw-stud consists of a hard-metal screw-threaded stem or end 15 and an integral semi-soft metal ball 16, hence a member of bimetallic structural form. The ball is solid and integrally formed with an annular skirted shoulder 17 adjacent the screw stud 15. It is seen that the bimetallic ball 16 of solid form rests within the seat of the annular flange 13. A retaining disk ring, in the form of a common bolt washer 18, engages the ball 16 in spaced relation from the annular seat 13. This disk ring has a central perforation which may approximate the diameter of the annular flange 13, while the ball 16 is of larger diameter and thereby is confined between the spaced swivel seat parts 13 and 18. The two ball-seat members 13 and 18 are coaxial in relation, and the ball 16 may have limited turning motion relatively therein, as in conventional mirrors.

Two or more screws 19 are inserted through the screw holes in the mirror housing 12 and are screw-threaded into the disk ring 18 for retaining the bimetallic ball 16 in assembled position between its two spaced seat members 13 and 18. The holes through the mirror housing 12 for the screws 19 are not threaded, and thus the screws turn freely and draw the disk ring 18 against the semi-soft ball 16. By tightening and loosening the screws, a variable pressure adjustment is achieved for the ball seat parts 13 and 18 by which to tighten the ball in the mirror-housing assembly.

The hard-metal screw-threaded stud 15 is inserted through a hole in the outer end of the arm 10, and a hard-metal cap nut 20 is screwed onto the stud. This assembly retains the ball 16 and the mirror-head assembly in service position on the bracket arm 10. It is seen that the cap nut 20 sets the arm 10 securely against the annular semi-soft metal shoulder 17 forming part of the ball 16 and thus spaces the back side of the mirror from the arm to provide clearance for relative motion and hence adjustment of the mirror on the arm. In this manner, the cap nut 20 rigidly anchors the arm 10 and ball 16 together as a complete assembly and thus mounts the mirror 11 in service position.

By loosening the screws 19 in the disk ring 18, the ball seat parts 13 and 18 release their biting and cushioning grip on the ball 16. Accordingly, the mirror-head assembly may be movably adjusted in relation to the stationary ball 16 and arm 10. When a proper adjustment is attained for exact rear-view reflection to the driver inside the car, the screws 19 are again tightened in order to securely fix the mirror-head and hence the glass 11 against displacement.

An important feature of the invention is demonstrated by Figs. 5, 6 and 7. The solid ball stud portions 15 and 16 are bimetallic, that is, they are composed of two different metals. The screw stud 15 may be an iron or steel stock part of economical manufacture and hence have hard screw-threads for endurance against wear, while the ball 16 with its annular skirted shoulder 17 is formed of zinc base metal used in die-casting work. Zinc metal is somewhat softer than iron or steel and thus provides a ball 16 which is semi-soft and well adapted for gripping the swivel seat parts 13 and 18 onto the ball with a cushioning effect.

In this connection, the cap nut 20 compresses and cushions the flattened end of the arm 10 against the semi-soft metal shoulder 17 to effect an immovable joint therewith. The hard-metal screw-threaded stud 15 withstands the screw pressure wear of the cap nut 20, while the semi-soft metal ball sets itself into its seat parts 13 and 18 without undue tightening pressure of the screws 19 and hence without undue pressure on the mirror housing 12.

Thus in Fig. 5, there is first illustrated one example of plain ordinary screw bolts of iron or steel which are inexpensive because they may be purchased from standard stock supplies. Next, Fig. 6 shows (in section) the ball 16 and its skirted shoulder 17 molded onto the head end 21 of the bolt to provide the hard-metal screw stud end 15. And finally, Fig. 7 is an illustration of the bimetallic member made in its complete form. Accordingly, there is provided a ball-stud of bimetal form, each metallic portion of which performs its independent function in the combination.

Not only is this new bimetal swivel-joint more economical to produce than conventional unimetal ball screw stud types, but its bimetal formation has the advantage of providing a semi-soft ball 16 for more positive coaction with its seat portions 13 and 18 and also the screw-threads 15 of the stud may be of conventional hard metal and thus resistant to wear and tear under heavy screw pressure of the cap nut 20.

Since the nut 20 may be subject to frequent tightening and loosening operations in repairing and servicing work on a motor truck, it follows that my retention of the conventional hard-metal screw stud 15 is of marked advantage when providing the new semi-soft cushioning ball joint 16 for attaining economy in manufacture and a new mode of utility in the shock-proof function of the swivel-joint combination.

The disclosure herein explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

This invention is presented to fill the need for a new and useful adjustable automotive mirror mounting. Since various modifications in construction, mode of operation, use and method, may and often do occur to others, especially so after acquaintance with an invention, it is to be understood that this disclosure is exemplary of the principles and of equivalent constructions, without being limited to the present showing of the invention.

What is claimed is:

In an automotive rear-view mirror fixed in a mirror-back housing, with a solid ball seated within a perforation formed through the housing and being gripped by a disk ring seated on said ball by screws, thus providing a swivel-ball joint, and a stud with a threaded end extending outward from the ball through the perforation and anchored by a nut on a supporting arm adapted to be attached to a car body for mounting said rear-view mirror in service position—the improvement in said swivel-ball joint consisting in forming said solid ball of semi-soft metal integral with and around one end of said stud, the stud being formed of full-hard metal, and including a semi-soft annular metal shoulder integral with the ball on and around the stud, the threaded end of said stud extending from the semi-soft annular metal shoulder and through the supporting arm, whereby the nut jams the arm against the semi-soft shoulder to provide a cushioned compression anchorage between the housing and the arm, while the screws draw the disk ring into cushioned compression biting engagement with the semi-soft ball, thereby interposing two such semi-soft cushioned compression joints between the rear-view mirror and the supporting arm.

JOSEPH FISCHER.

REFERENCES CITED

The following references are of record in the file of this patent:

UNITED STATES PATENTS

| Number | Name | Date |
|---|---|---|
| 986,451 | Franks | Mar. 14, 1911 |
| 1,087,808 | Miller | Feb. 17, 1914 |
| 1,386,959 | Severance | Aug. 9, 1921 |
| 1,472,566 | Oishei | Oct. 30, 1923 |
| 2,328,330 | Edington | Aug. 31, 1943 |
| 2,332,893 | Clickner | Oct. 26, 1943 |
| 2,477,762 | Monroe | Aug. 2, 1949 |